Dec. 13, 1955   E. E. ENSIGN ET AL   2,726,431
PROCESS FOR PRODUCING A SAND-RESIN
MOLDING MEMBER BY VIBRATING
Filed Dec. 15, 1951
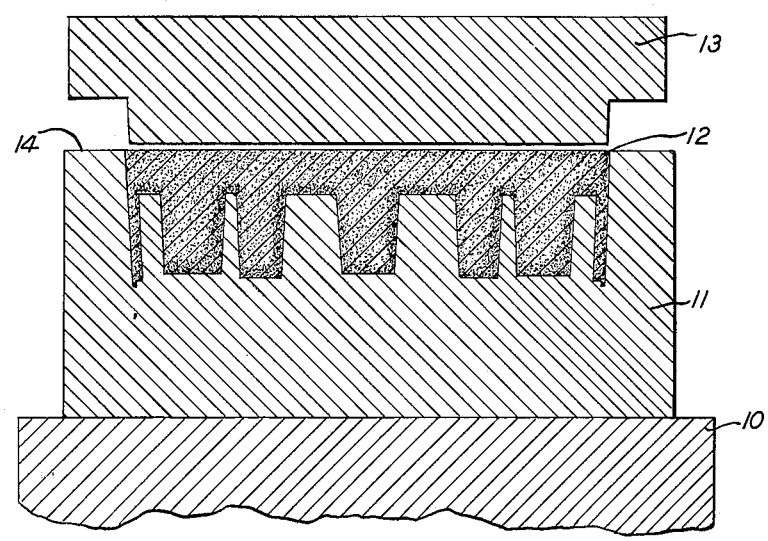
J.M. BLEUENSTEIN
E.E. ENSIGN
R.A. VAN PATTEN
INVENTOR.
BY E.C. M<sup>c</sup>Rae
J.P. Faulkner
J.H. Oster
ATTORNEYS United States Patent Office 2,726,431
Patented Dec. 13, 1955

2,726,431

PROCESS FOR PRODUCING A SAND-RESIN MOLDING MEMBER BY VIBRATING

Elbert E. Ensign, Ypsilanti, Royal Arch Van Patten, Garden City, and Julius M. Bleuenstein, Detroit, Mich., assignors to Ford Motor Company, Dearborn, Mich., a corporation of Delaware Application December 15, 1951, Serial No. 261,852

2 Claims. (Cl. 22—193)

This invention lies in the field of metal founding and more specifically deals with an improvement in a molding process generally known as "C" or shell molding. Basically, the shell molding process consists in the formation of a core, shell or mold by the application of a sand, phenol-formaldehyde resin mixture against an appropriately shaped and heated metal mold. This process has been adequately described in the recent periodical literature and will not be further described here.

Conventionally the molding mixture used in the shell process comprises about 93 percent of No. 90 AFS sand mixed with 7 percent of a thermosetting phenol-formaldehyde resin. This sand, resin mixture is applied to the hot metal pattern by inverting a container of the sand mixture over the heated pattern. This process has been found commercially satisfactory where very fine finishes are not required and where the sand is not required to enter narrow spaces. The present invention was developed to enhance the as cast surface of the castings and to permit narrow sections to be cast. This invention is probably best understood by a study of the drawing which represents a vertical section through an apparatus employed in making a detailed, small mold. In this drawing a jolt table is indicated at 10. Superimposed upon jolt table 10 is pattern 11. Pattern 11 is shown with a sand, resin mold 12 in place. Pressure plate 13 is in turn superimposed upon pattern 11 and mold 12. In executing the instant process, the conventional mixture of 93 percent No. 90 AFS sand and 7 percent phenol-formaldehyde resin modified by the replacement of a portion of the No. 90 AFS sand with silica flour. Normally with the No. 90 AFS sand, from 5 to 15 percent of silica flour in the final mix has been found to give the best results. However, the use of coarser or finer base sands will require a corresponding and appropriate modification of the amount of silica flour to give an improved finish.

In the execution of this process, metal pattern 11 is heated to a temperature which will at least partially cure the plastic material of the sand, resin mixture. Such a temperature should be at least 350° F. The heated pattern 11 is placed upon jolt table 10 and only after jolt table 10 is in operation, the sand, resin mixture is poured into pattern 11. Immediately after pattern 11 has been filled with the sand, resin mixture it is struck off flush with the top of surface 14 and the jolting continued during the initial curing period which may be as brief as 20 seconds or as long as several minutes, depending upon the precise temperature at which pattern is held and the exact composition of the resin. To aid in the initial flow of the sand, resin mixture into all of the cavities of pattern 11, pressure plate 13 may be superimposed upon pattern 11 and its inertia used to aid such flow. It is of course essential that pressure plate 13 be light enough and be removed from the system early enough that the mold 12 is not damaged. This process has resulted in the production of some especially fine as cast surface finishes when used with metals ordinarily difficult to cast with an acceptable finish. For example, parts cast in SAE 1040 steel have a very smooth finish and require for many purposes, no further machining or other finishing operations. This finish results from an unpredictable segregation of the silica found in the proximity of the pattern surface. Microscopic examination of the mold will show the silica flour content to be decidedly non-uniform and to be much higher adjacent the pattern surface. It is thought that this movement is occasioned by a slight flow of the resin during the curing which flow carries with it preferentially a portion of the silica flour. This flow of silica flour to the casting surface results in the production of a much finer as cast surface than would normally be expected from the amount of silica flour added.

I claim as my invention:

1. The process of producing a metal molding member comprising heating a metal pattern to a temperature of at least 350° F., energetically vibrating the heated pattern, contacting the vibrating metal pattern with a sand resin mixture in which the sand grains are of non-uniform size, whereby the heat and vibration cause at least a portion of the sand resin mixture to flow and during at least a portion of the time the resin is curing upon the pattern and while the pattern is being vibrated subjecting the sand resin mixture to a periodically varying pressure whereby a surface is produced in which the average grain size is smaller than that of the original sand resin mix.

2. The process of producing a metal molding member comprising heating a metal pattern to a temperature of at least 350° F., energetically vibrating the heated pattern, contacting the vibrating metal pattern with a mixture of silica flour, comparatively coarse sand and resin whereby the heat and vibration cause at least a portion of the sand resin mixture to flow, and during at least a portion of the time the resin is curing upon the pattern and while the pattern is being vibrated subjecting the sand resin mixture to a periodically varying pressure whereby a surface is produced in which the average grain size is smaller than that of the original sand resin mix.

References Cited in the file of this patent

UNITED STATES PATENTS

| | | |
|---|---|---|
| 1,086,824 | Hewlett et al. | Feb. 10, 1914 |
| 1,467,112 | Lucier | Sept. 4, 1923 |
| 1,703,708 | Candler | Feb. 26, 1929 |
| 2,435,227 | Lester | Feb. 3, 1948 |
| 2,482,257 | Frei | Sept. 20, 1949 |

OTHER REFERENCES

FIAT Final Report No. 1168 (The "C" Process), May 30, 1947. 10 pages. Pages 1 and 2 relied on.

The Foundry, Oct. 1950, (article by Less). Pages 162, 164, 168.